United States Patent [19]

Britzke et al.

[11] Patent Number: 4,495,729
[45] Date of Patent: Jan. 29, 1985

[54] PIVOTABLE SLIDING DOOR FOR VEHICLES

[75] Inventors: Ingo Britzke, Kassel; Dietmar Dilcher, Vellmar, both of Fed. Rep. of Germany

[73] Assignee: Gebr. Bode & Co. GmbH, Kassel, Fed. Rep. of Germany

[21] Appl. No.: 331,628

[22] Filed: Dec. 17, 1981

[30] Foreign Application Priority Data

Dec. 24, 1980 [DE] Fed. Rep. of Germany ....... 3049189

[51] Int. Cl.³ ............................................. E05D 15/10
[52] U.S. Cl. ........................................ 49/212; 49/216; 49/221
[58] Field of Search ................. 49/212, 209, 221, 223, 49/213, 214, 215, 216, 217, 218

[56] References Cited

U.S. PATENT DOCUMENTS 3,051,999  9/1962  Schimek ................................. 49/212
3,100,667  8/1963  Schwenk ............................... 49/214
3,728,819  4/1973  Goldbach et al. ..................... 49/216

FOREIGN PATENT DOCUMENTS 2237395  1/1974  Fed. Rep. of Germany ........ 49/212

Primary Examiner—Philip C. Kannan
Attorney, Agent, or Firm—Roberts, Spiecens & Cohen

[57] ABSTRACT

A pivotable sliding door with a main track is suspended in a door frame with a running track by a suspension means having two staggerly jointed partial carriages, the rollers of one of the partial carriages rolling in the main track and the rollers of the other partial carriage rolling in the running track.

7 Claims, 6 Drawing Figures

PIVOTABLE SLIDING DOOR FOR VEHICLES

BACKGROUND OF THE INVENTION

This invention concerns a pivotable sliding door for vehicles, the upper slideway of which has a pivotable main track parallel with and fixed to the door frame, within which a wheeled suspension frame for the door panel travels.

A pivotable sliding door of this type is known. In the familiar design a telescoping track is set into the main track, the former having at its end a roller, upon which the door panel rests during its sliding movement, whereby stops for the door panel draw the telescoping track out of the main track. The pivoting of the door panel out of the door opening takes place with the aid of an arm fixed to the door panel; the end of the arm being led by means of a roller slideway in a curved track at one end.

With this type of design the telescoping track guideway must be relatively expensively constructed due to the overhanging door length or width in its open position, which is necessary for efficient opening of the door panel.

SUMMARY OF THE INVENTION

The invention is based upon the necessity for providing a sliding door, designed in such a way that the forces resulting from the overhanging of the door panel can be lessened with simpler means and such as to assure that in its closed position, the door panel together with the entire door carriage, is located within the door opening so that the danger of freezing of the carriage is avoided.

The invention achieves this object by utilizing a wheeled suspension frame, consisting of two rod-shaped partial carriages joined to and lying staggered to each other, whereby the one partial carriage rests in the main track and the other staggered carriage is set into a runway track fixed to the door panel. The main track as well as the runway track correspond in their length to the width of the door opening and whereby the wheeled suspension frame, made up of the two partial carriages, also corresponds to the length of the main track and/or the runway track.

In such design the two partial carriages can be arranged horizontally in tandem. It is, however, possible using another design to position the two partial carriages one above the other. The main track and the runway track have a C-configuration, so that the carriage rollers or roller pairs of the wheeled suspension frame can serve as either support rollers or guide rollers, according to the axis of the rollers.

In detail the design is so conceived that the partial carriages have several roller pairs with superimposed rollers having a horizontal axis and several such pairs having a vertical axis.

This design makes it possible for the main track which is fixed to the parallel guide arms to be tilted outward when the door panel is tilted. When the door panel is slid, the partial carriage on the main track is also slid until it is stopped at the end of the main track. At that point the further sliding motion of the door takes place by the shifting of the track upon which the other partial carriage rides, thus making it possible the complete opening of the door panel.

It is, of course, possible to put this motion into reverse, by the door panel with its track being slid onto the partial carriage and the other partial carriage in turn being shifted to the main track.

Since one of the partial carriages always remains in the main track when the door panel is opened, the door panel is securely supported when in open position, so that no additional means for support is necessary when the door is in the open position; and in particular no means for support need be placed outside the door opening without protection.

BRIEF DESCRIPTION OF THE DRAWING

Other objects, the features and advantages of the invention will be apparent from the following detailed description when read in conjunction with the accompanying drawing which shows by way of example and not limitation the presently preferred embodiment of the invention. In the drawing.

DESCRIPTION OF THE PREFERRED EMBODIMENTS

Figure 2:
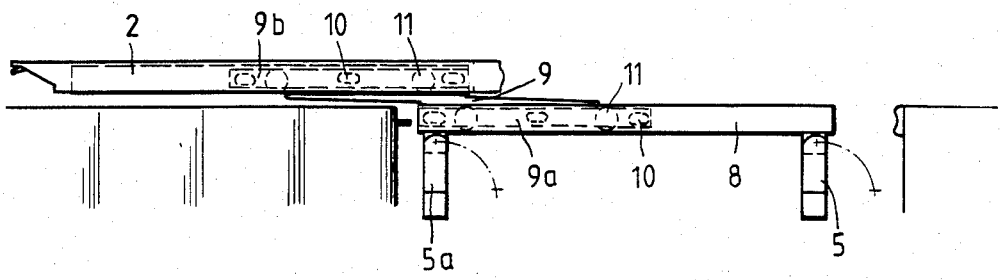
FIG. 2 shows the sliding door in outline and in an open position.

The door panel 1 has a permanently attached running track 2 in C-configuration. At the door frame 3 or at the vehicle body, the vertical posts 4 are attached for supporting two parallel guide arms 5 and 5a having the jointed axles 6 and/or 7. (Cf. also FIG. 5). To the parallel guide arms 5/5a the main track 8 is attached flexibly, which track is also basically of a C-configuration. In the main track 8 as well as on the running track 2 a wheeled suspension frame 9 is supported, consisting of the jointed partial carriages 9a and 9b. (Cf. FIG. 2).

Figure 3:
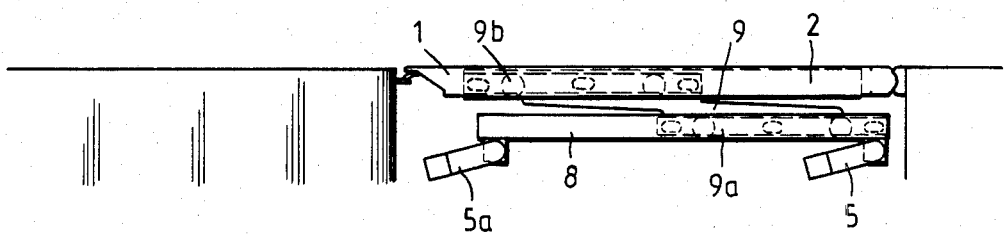
FIG. 3 shows the sliding door in outline and in a closed position.

The two partial carriages 9a and 9b are—as shown in FIGS. 2 and 3—two elongated, rod-like structures, which support several pairs of rollers. The length of the rod-like roller carriages corresponds approximately to the width of the door.

On each of the partial carriages 9a/9b pairs of rollers 10 with a horizontal axis and pairs of rollers 11 with a vertical axis are attached.

Figure 5:
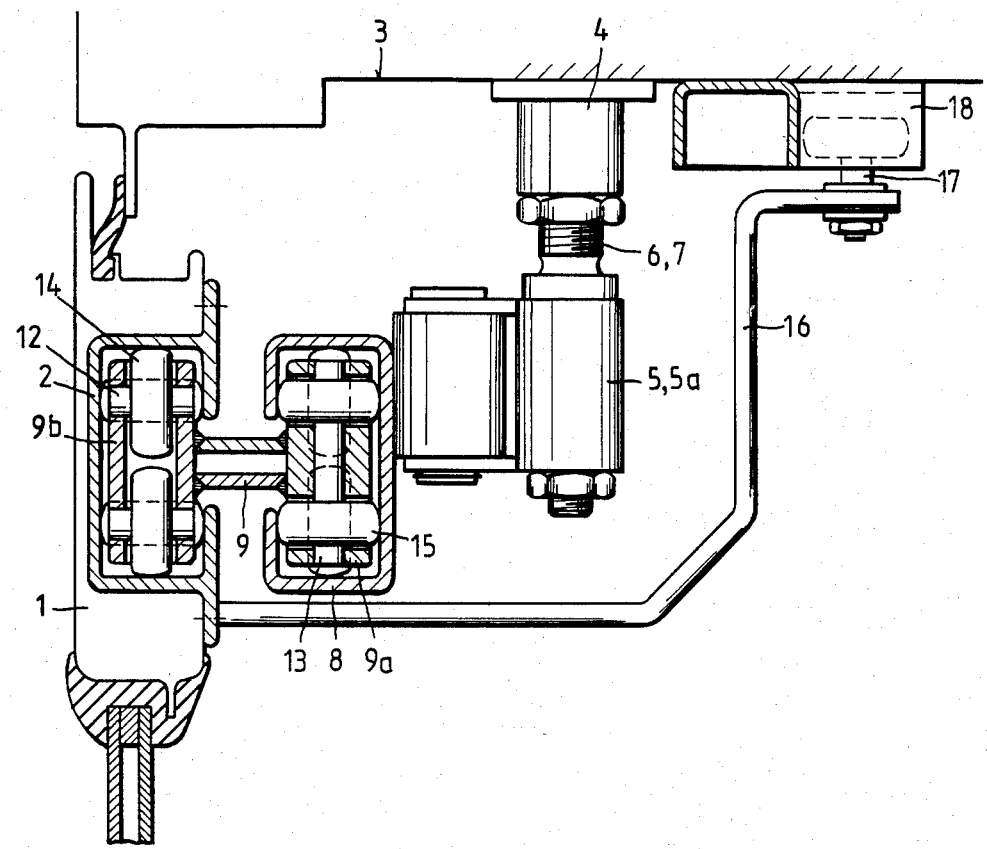
FIG. 5 shows a cross-section along the axis V—V of FIG. 1.

FIG. 5 shows, in enlarged scale, the pair of rollers 14 with horizontal axis 12 corresponding to the roller pair 10 in FIG. 2 and the roller pair 15 with vertical axis 13, corresponding to roller pair 11 in FIG. 2.

Figure 1:
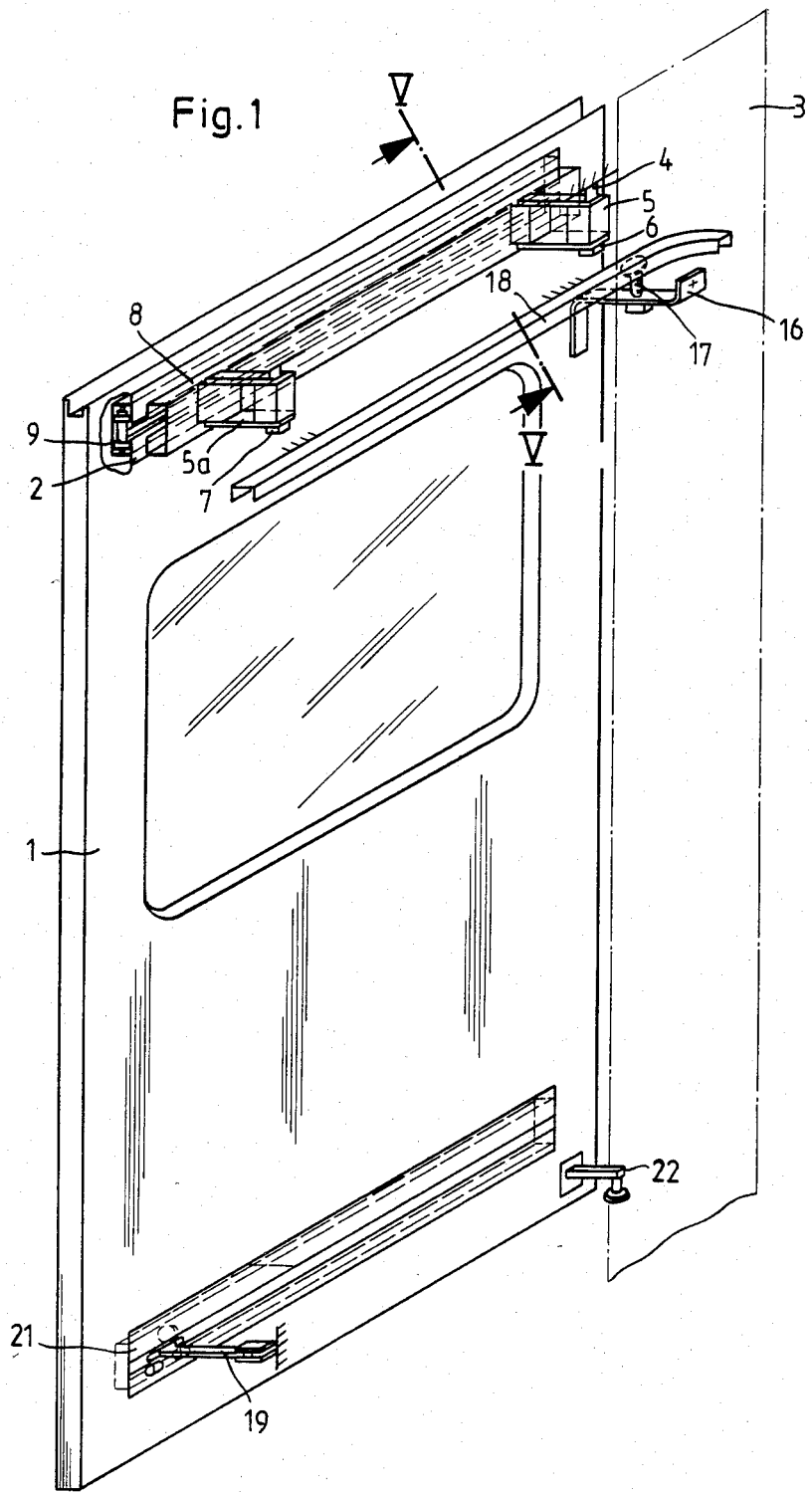
FIG. 1 shows the sliding door in perspective as seen from within.

Operation of the door panel takes place with the aid of the arm 16 (Cf. FIG. 1) which is permanently attached to the door panel 1; this arm having a guide roller 17 which runs in a U-track, open at its bottom, the same being curved at the end. By means of the curvature at the end, the door panel is carried out of the door opening.

Once the pivoting motion of the door panel has taken place in this fashion, the sliding of the door panel 1 can proceed in the following manner: first, the door panel 1 is shifted to the partial carriage 9b, i.e., the roller pairs 10/11 in the running track 2. (FIGS. 2 and 5). Once the door panel has then reached the mid-point of the door opening, it strikes a stop. This causes the partial carriage 9a to run on the main track 8 until this partial carriage reaches the end of the main track. By this means the door panel is now fully in the open position. (FIG. 2)

Basically, it is of course possible to reverse the course of this movement so that the partial carriage 9a is shifted to the main track and after reaching the end of this main track the door panel is further transported on the partial carriage 9b.

In each case while the door panel is in the open position, one partial carriage, namely, partial carriage 9a, remains seated in the main track so that the door panel is securely supported while in the open position, since the partial carriage is securely supported in the main track by the roller pairs.

Figure 4:
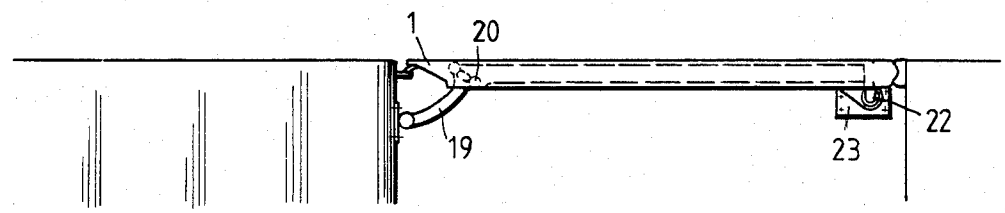
FIG. 4 shows the lower track mechanism for the door panel.

In FIG. 4 the lower track mechanism of the door panel is depicted. It consists of a flexibly mounted swinging arm 19 mounted on the vehicle body, the arm having a roller carriage 20, which runs in a box track 21 fixed to the door panel 1. The roller carriage consists of support and guide rollers in a convention manner.

To secure the door panel in its closed position an additional entry roller 22 can be provided, which runs into an entry slot 23 set into the vehicle body.

Figure 6:
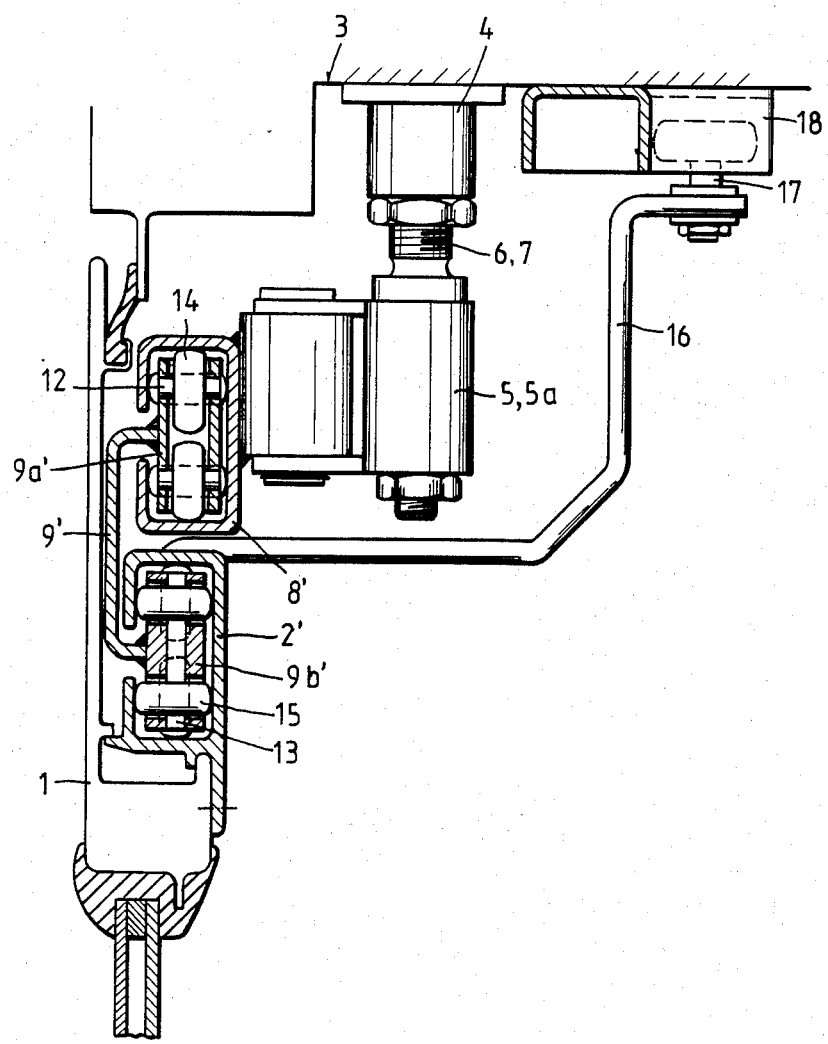
FIG. 6 shows another embodiment of the invention.

In FIG. 6 another embodiment of the wheeled suspension frame 9 is depicted. With the embodiment shown in FIG. 5 the partial carriages 9a and 9b lie horizontally in tandem to each other. With the design shown in FIG. 6 the partial carriages 9a'/9b' lie one atop the other. The remainder of the construction is the same as shown in FIG. 5.

What is claimed is:

1. A pivotable sliding door apparatus in the door frame of a vehicle comprising: a pivotable main track mounted upon the door frame; a running track fixedly mounted on the door panel; and a suspension means comprising two staggered and connected elongated partial carriages, said partial carriages each having a plurality of rollers, one of said partial carriages being rollably mounted in said main track, the other of said partial carriages being rollably mounted in said running track.

2. The pivotable sliding door apparatus of claim 1 wherein the length of said main track, said running track and said suspension means is substantially equal to the width of the door opening.

3. The pivotable door apparatus of claim 1 wherein the two partial carriages are arranged horizontally in tandem.

4. The pivotable door apparatus of claim 1 wherein the two partial carriages are arranged one atop the other.

5. The pivotable door apparatus of claim 1 wherein the main track and the running track have basically a C-configuration.

6. The pivotable door apparatus of claim 1 wherein the partial carriages have several roller pairs with superimposed rollers with a horizontal axis and several roller pairs with a vertical axis.

7. The pivotable door apparatus of claim 1 wherein the door panel has a rigid arm which is provided at its end with a guide roller, and said door frame has a fixed track which is curved at its end through which said guide roller rolls.

* * * * *